United States Patent [19]

Davidson

[11] Patent Number: 4,672,898
[45] Date of Patent: Jun. 16, 1987

[54] MULTI-LOCATION ADJUSTABLE TABLE

[76] Inventor: Henry A. Davidson, 1818 Port Wheeler, Newport Beach, Calif. 92660

[21] Appl. No.: 835,885

[22] Filed: Mar. 4, 1986

Related U.S. Application Data

[63] Continuation-in-part of Ser. No. 542,497, Oct. 17, 1983, abandoned.

[51] Int. Cl.⁴ .................. A47F 5/12; A47B 11/00; A47B 9/00
[52] U.S. Cl. .................................. 108/6; 108/44; 108/139; 108/142; 108/144; 403/108
[58] Field of Search ................ 108/1, 5, 6, 8, 42, 108/43, 44, 49, 94, 102, 103, 104, 105, 134, 137–142, 144; 248/411, 412, 337; 403/104, 108, 374, 323; 269/69, 70, 204, 208

[56] References Cited

U.S. PATENT DOCUMENTS

| | | | |
|---|---|---|---|
| 872,905 | 12/1907 | Connors | 108/8 |
| 960,483 | 6/1910 | Becker . | |
| 1,007,590 | 10/1911 | Miller . | |
| 1,223,230 | 4/1917 | Anderson | 108/49 |
| 1,247,112 | 11/1917 | Holmberg et al. | 108/139 |
| 1,312,274 | 8/1919 | Sculthorp . | |
| 1,373,027 | 3/1921 | Simon . | |
| 1,425,067 | 8/1922 | Stone | 248/412 X |
| 1,862,237 | 6/1931 | Pepler . | |
| 2,077,337 | 4/1937 | Lifvendahl | 108/134 X |
| 3,157,379 | 11/1964 | Platakis . | |
| 3,479,973 | 11/1969 | Bartlett et al. | 108/141 |
| 3,864,048 | 2/1975 | Parker | 403/108 X |
| 4,085,763 | 4/1978 | Thomas | 403/108 X |
| 4,086,859 | 5/1978 | Dondero | 108/142 |

FOREIGN PATENT DOCUMENTS

| | | | |
|---|---|---|---|
| 774796 | 12/1934 | France | 108/134 |
| 1208680 | 2/1960 | France | 108/8 |
| 438463 | 11/1935 | United Kingdom | 108/8 |

Primary Examiner—Kenneth J. Dorner
Assistant Examiner—Mark W. Binder
Attorney, Agent, or Firm—Gordon K. Anderson

[57] ABSTRACT

An adjustable table with a bulkhead bracket (20) permanently mounted on the wall or vertical surface of a watercraft, recreational vehicle, or the like. A davit shaped arm (30) slips into the bracket (20) and is axially rotatable, with detents (34) interfacing into notches (24) in the bracket for placement. A top attaching bracket (40) slips over the arm (30) on the horizontal end with detents (34) penetrating a pair of holes (42) to maintain stability and achieve adjustment. A top (50) is permanently secured to the top attaching bracket (40) providing a flat work surface and rotatable 360 degrees from the wall, also tilting 90 degrees horizontally for access.

4 Claims, 13 Drawing Figures

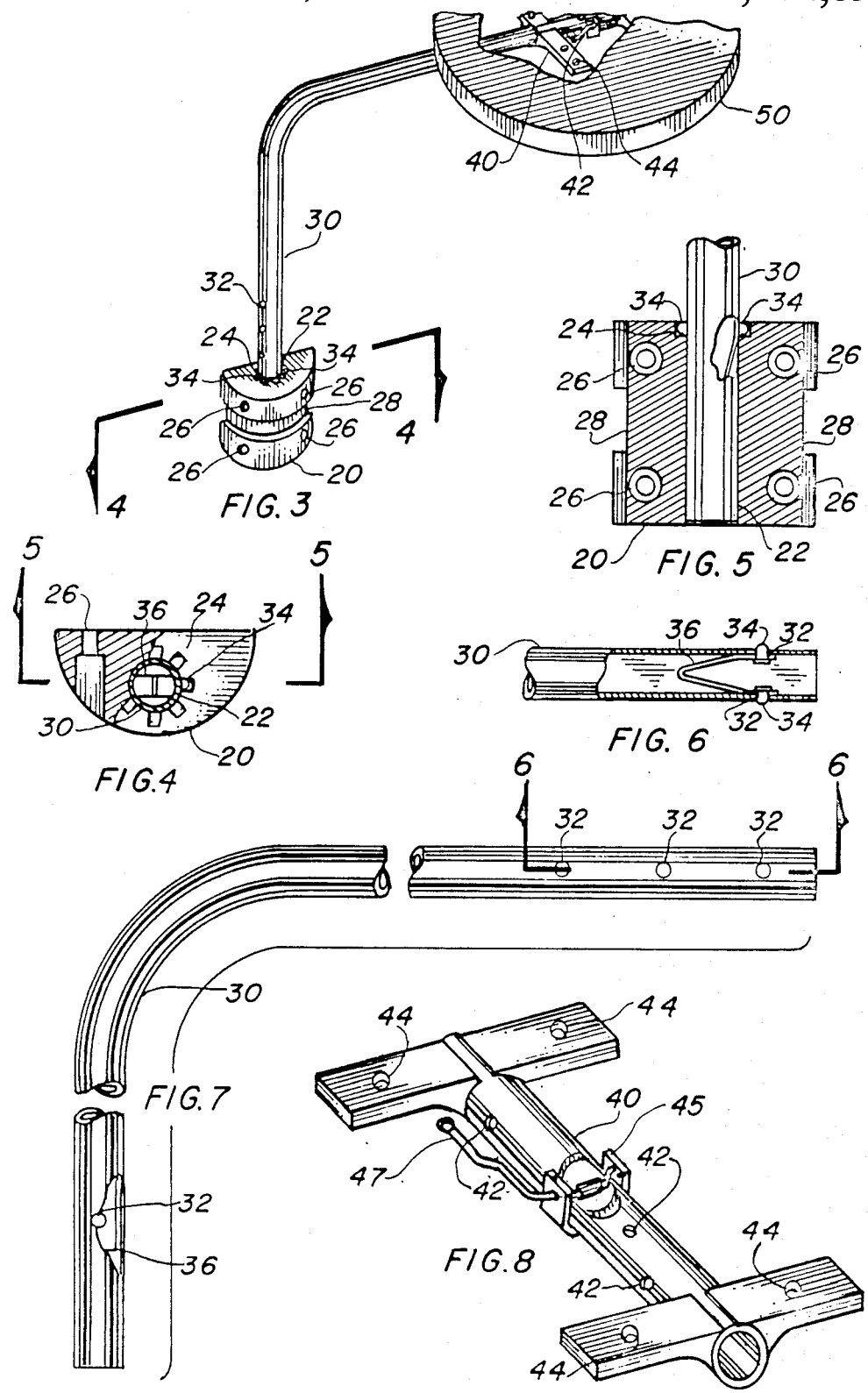

MULTI-LOCATION ADJUSTABLE TABLE

CROSS REFERENCE TO RELATED APPLICATION

This application is a continuation-in-part of application Ser. No. 542,497 filed Oct. 17, 1983, now abandoned.

TECHNICAL FIELD

This invention relates in general to horizontal supported planar surfaces with pivotal adjustments in conjunction with support brackets and more specifically to tables with removable arms and multi-located stationary brackets having horizontal rotational and vertical adjustments.

BACKGROUND ART

Tables for use in portable vehicles that have the need for space conservation have previously been limited to the hinged type that are attached to a wall or bulkhead. Further, in mobile homes or recreational vehicles, the table consists of a base permanently mounted onto the floor with a slip fit pedestal attaching into the member with a similar bracket under the top allowing removal and storage in separate pieces, various hinged tables have also been adapted for this purpose with arcuating arms and rigid posts or legs for bracing.

In other areas of utility, tables have been adapted for use with beds, such as taught by Pepler in U.S. Pat. No. 1,862,237 where a table top is adjustably secured with a supporting plate using compression on a horizontal leg of an angular rod. The vertical end is supported by a set screw in a tubular standard rotatably mounted into a bearing. Friction caused by a threaded fastener, either directly on the supporting arm, or with a bracket distributing the compression provides the adjustment for the location of the table top, with respect to the attachment base.

Miller in U.S. Pat. No. 1,007,590 discloses a table with the top permanently attached to a flat arm on one end. The other end of the arm is adjustably pivoted on a base adapted to slide over the pindle of a hinge or projection on a dental cabinet.

U.S. Pat. No. 1,373,027 issued to Simon employs a flat top affixed to a pivoted bracket with pivotal arms supported on an upright member with a series of trunnions allowing rotation. Adjustment is achieved by swiveling the entire device in a pair of separable clamps.

Still another method of rotating a table is taught by Sculthorp in U.S. Pat. No. 1,312,274, wherein a clamp with a socket is utilized on either end of a pivotal hinged arm. In this, and the other forementioned art, location of the table top is afforded by a threaded fastener placing compression on the member, or it is held in such a manner as to freely rotate within the confines of the mating element.

Other patents lending themselves to horizontal tiltable and pivotal tables may be considered material in the sense of prior art, with respect to this application are U.S. Pat. Nos. 960,483 of Becker and U.S. Pat. No. 3,157,379 issued to Platakis. However, neither of these are considered to have teachings which disclose or suggest the overall combination of this invention.

DISCLOSURE OF THE INVENTION

Since recreational equipment, such as boats and vehicles, have been popularized the need has existed to have a table surface that economizes space. The table needs to be easily adjustable in any desired position, up to 360 degrees in rotation, and positioned vertically against a wall or bulkhead when not in use, thereby occupying as small a space as possible. The instant invention, therefore, fills this need becoming the primary object to accomplish the above as well as being adjustable away from the bulkhead and in height from the floor, deck, or ground. An important object allows the table to be adjusted vertically permitting the user to be seated in a small confined area, such as found in a boat cockpit or dining area of a recreational vehicle, and then rotated 90 degrees flat, providing a usable horizontal table surface.

A further object provides adjustment in all directions in a simple manner without the use of tools on threaded fasteners frictionally compressing and holding fast mating surfaces. This is accomplished by using one hand to release the stabilizer lever and simultaneously depress detent pins, and at the same time move the table top rotationally, horizontally, or vertically. Since the operation is simple and easily manipulated, it may be quickly accomplished with ease. Along with this simple release procedure, the stabilizer lever adds a positive anti-rotational locking feature to the table top, thus eliminating completely any play or slight movement that may be present due to the tolerance between the detent pins and holes in the table top bracket.

Another object takes advantage of the capability of removing the major assemblies individually for storage, utilizing the ultimate minimum amount of space. The bulkhead bracket is permanently attached to the boat or vehicle, and may be in multiples attached at more than one convenient place, allowing one table to be used in various locations. The other two components, the davit shaped arm and table top, separate and may be stowed within cabinets, drawers, closets, etc.

Still another object takes advantage of the ability to use corrosion resistant or retardant materials or coatings for marine use where deleterious environments exist.

Yet another object allows extended flexibility as the table is suitable for temporary or permanent use in spaces normally designated for other uses in confined areas, such as might exist in boats, airplanes, recreational vehicles, mobile homes, offices, hospitals, and residences. As an example, in a boat the table may be installed inside the cabin, on the fore or aft deck in the lounging area or cockpit.

Still further, in a recreational vehicle this invention is well adapted for mounting in the dining or cocktail area, further its use includes mounting outside with the bracket attached to the exterior wall, such as under an awning, with the davit arm inverted.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 3 is a partial isometric view of the preferred embodiment with all of the elements connected and the bulkhead bracket below the horizontal axis of the table with the top partially cut-away.

FIG. 4 is a cross-sectional view taken along lines 4—4 of FIG. 3 partially cut-away, depicting one of the mounting holes.

FIG. 5 is a partial cross-sectional view taken along lines 5—5 of FIG. 4 showing the arm inserted into the bracket.

FIG. 6 is a partial cross-sectional view taken along lines 6—6 of FIG. 7 with one end viewed in total.

FIG. 7 is a fragmentary view of the davit arm removed from the assembly.

FIG. 8 is a partial isometric view of the top attaching bracket completely removed from the top and unassembled from the davit arm.

BEST MODE FOR CARRYING OUT THE INVENTION

Figure 1:
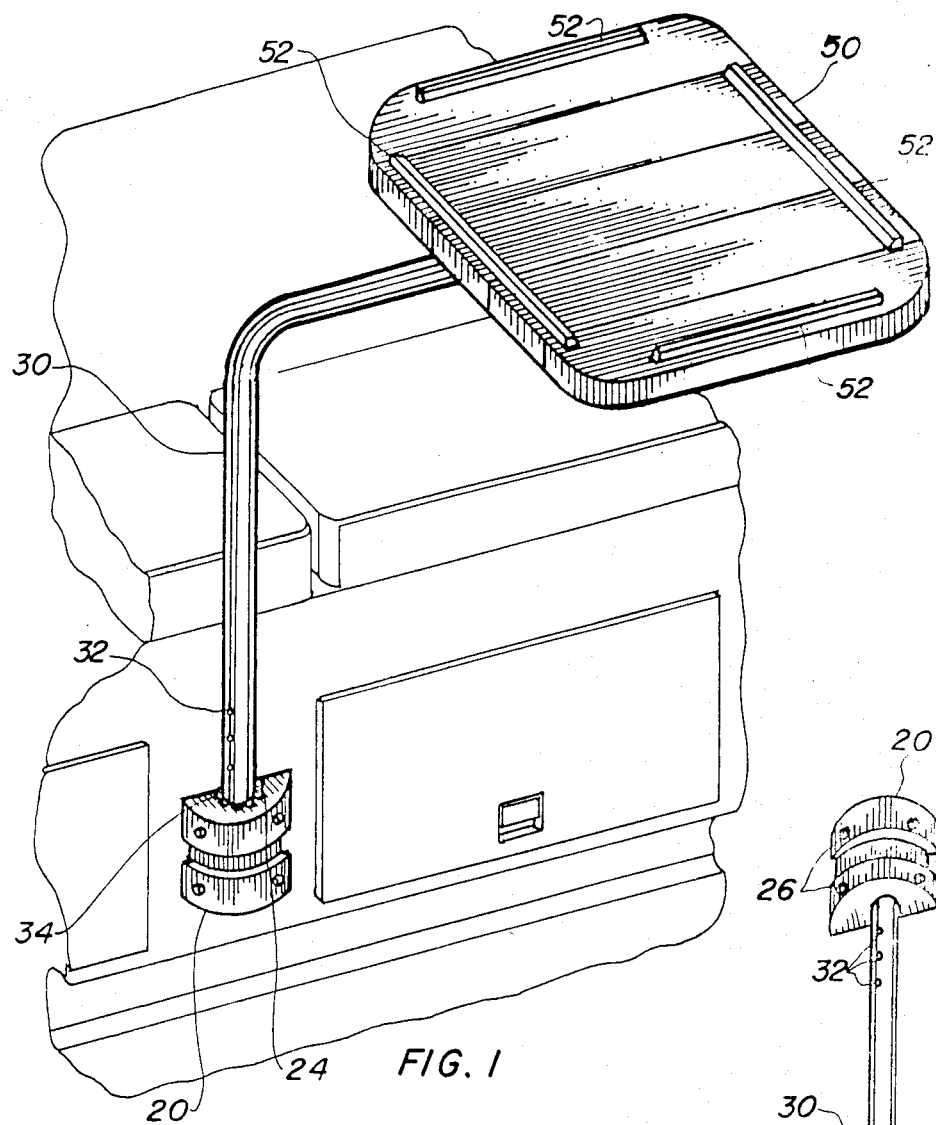
FIG. 1 is a partial isometric view of the preferred embodiment installed in the cockpit of a boat, depicted with a square top.

Referring now more specifically to the referenced characters of the drawings, the invention in the preferred embodiment utilizes a bulkhead bracket 20, best illustrated in FIGS. 1 through 5, that is in a half-cylindrical shape with a flat top and bottom. In the flat is a cavity 22 that penetrates completely through from top to bottom. At the top of the bracket 20 the cavity is enlarged forming a plurality of notches 24 in symmetric array. These notches 24 are around the top periphery of the cavity 22, and are deeper than they are wide and contain a tapered surface at the bottom. Further, the bracket 20 contains a plurality of mounting holes 26, preferably four, a pair on each side of the cavity 22. These holes 26 are counterbored to allow the attaching fastener to penetrate out of the way and provide a flat surface to interface with the head of the fastener. A groove 28 may be incorporated in the side to remove surplus material for appearance and to lighten the bracket, but is unnecessary for structural purposes. The bracket 20 may be of any structural material, such as metal, wood, or thermoplastic, including acetals, polycarbonates, phenolics, ABS, etc., with nylon being preferred. The manufacturing process may be machining of the metal or nylon and injection molding the polycarbonate or ABS, and the like. The bracket 20 may be attached to a bulkhead or wall with any suitable threaded fasteners, such as wood screws, machine screws with nuts, structural rivets, etc.

A davit shaped arm 30, in angular form, best shown in FIGS. 6 and 7, communicates the structure from the bracket 20 to the balance of the table. This arm 30 is hollow and round in shape and contains a series of opposed bores 32 through both sides of each end. The diameter of the arm 30 is smaller in size than the cavity 22 in the bracket 20, allowing a slip fit for slideably affixing one end into the bracket cavity 22. The arm is radially formed, at right angles, with the length of both legs corresponding to the application in the boat, vehicle, etc., in both height and length. The bores 32 are arranged in multiples one on each side of the arm 30 at 180 degrees apart in geometrical array and as close together as required by the application. The arm 30 is made of any substance having the structural integrity for the purpose, such as steel, thermoplastic or magnesium, with aluminum being preferred.

At each end of the arm 30 is a spring loaded detent 34 positioned within the hollow tube and extending from a pair of bores 32. The detent 34 is round in outline and is of a diameter smaller than the bore 32, allowing protrusion therethrough when aligned from the inside of the arm 30. The detent 34 may also be slightly tapered, if desired, to reduce the fit within the bore 32. A flat leaf spring 36, best depicted in FIGS. 4, 6, and 7, is integral with the detent 34 and is in "V" shape, forcing the detents 34 radially away from each other. The detents 34 may be formed from the spring itself with the material extruded in hollow cylindrical shape, or may be separate pins with radial ends attached by forming a peened head grasping a hole in the spring against a shoulder. The action of the leaf spring 36 maintains pressure on the detents 34, urging them outward when the entire element is placed within the hollow arm 30. Further, as a series of bores 32 are located within each end of the arm 30, the detents 34 may be located within any pair allowing an adjustment away from the end as desired. Repositioning of the detent 34 is accomplished by placing the opposed detents 34 between the thumb and forefinger and sliding the spring linearly within the hollow arm 30. Opposed compression spring loaded detents may be utilized with equal utility.

A top attaching bracket 40, depicted in FIGS. 8 through 12, is in an "I" configuration with a round opening larger than the arm 30, allowing a slip fit when placed therein. This opening is longitudinal through the web of the "I" and penetrates the entire length of the bracket. A plurality of mating aligned holes 42 at 180 degrees apart are formed in the bracket that allow the detents 34 to penetrate in locking fashion. The bracket 40 provides an adjustable mounting plane when the horizontal end of the arm 30 is slideably received therein. The holes 42 are so positioned as to allow horizontal adjustment when the bracket is slipped linearly, also the sets of holes 42 are at 90 degree angles to each other allowing the bracket to be tilted vertically for access or locked into place for storage. The bracket 40 further includes end extending fingers that have a flat surface for mounting purposes, along with a plurality of fastening holes 44. This flat surface of the bracket 40 provides a structural mounting plane that is adjustable linearly, as well as rotatably.

In order to maintain a completely rigid and solid fit between the bracket 40 and the arm 30, a stabilizing lever assembly is employed. This lever arrangement is illustrated best in FIGS. 9 through 13 and consists of a "U" shaped mount 45 that is wrapped partially around the web of the bracket 40 with a lever clearance hole 46 interfacing at the top between the separated ends of the mount 45, leaving the area open and clear therebetween. The mount 45 is connected by welding, adhesive bonding, or the like, and is located near the middle of the bracket.

Figure 11:
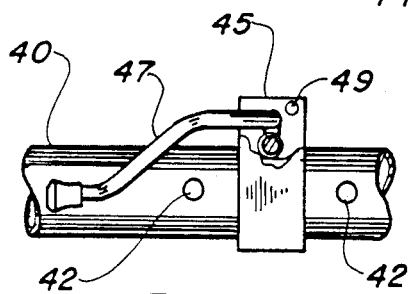
FIG. 11 is a view with the stabilizer lever in the locked position taken along lines 11—11 of FIG. 9.
Figure 12:
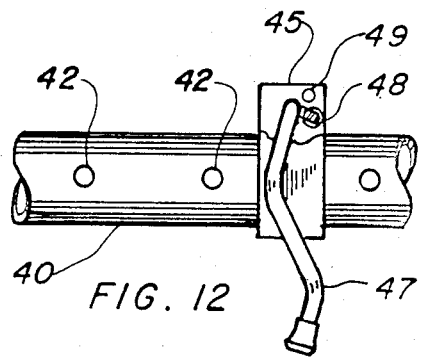
FIG. 12 is a view with the stabilizer lever in the unlocked position taken along lines 12—12 of FIG. 9.
Figure 13:
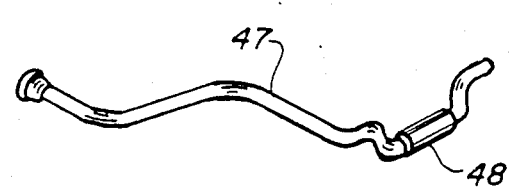
FIG. 13 is a partial isometric view of the stabilizer lever with the roller sleeve in place completely removed from the invention for clarity.

A stabilizer lever 47 is rotatably connected through the "U" shaped mount 45 on top of the attaching bracket 40 in such a manner as to apply pressure to the arm 30 when it is mounted inside the bracket 40. This lever 47 is depicted completely removed from the invention in FIG. 13 and as in use in FIGS. 8 through 12. The lever 47 is preferably a wireform and is configured with an offset handle portion on one end and a right angle downwardly depending cam section on the other. This cam portion further contains a roller sleeve 48 that is cylindrical in shape with an internal diameter somewhat larger than the lever 47, allowing the lever to revolve within the sleeve 48 when rotated. This sleeve 48 eliminates damage and wear to the arm 30 by the lever 47 when it is repeatably tensioned in the same area. The lever 47 is positioned with the handle portion rotated downwardly, as shown in FIG. 12, prior to connection to the arm 30, then rotated upwardly to a position parallel with the bracket 40, as illustrated in FIG. 11. This rotary movement of the lever 47 applies a cam action directly upon the arm 30 that is exposed by the hole 46 and renders the arm 30 stable and confined in relation to the bracket 40.

In order to locate the lever 47 at point where the maximum amount of pressure is exerted upon the arm 30 and to prevent the cam from traveling completely over center, a lever stop 49 is fixed to the mount 45. This stop 49 is any type of fastener, or member, that impedes the travel of the stabilizer lever 47, this includes a rivet, capscrew, pin, etc., with a round head drive screw preferred.

Figure 10:
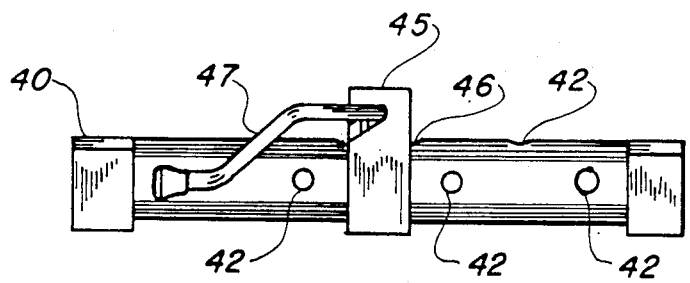
FIG. 10 is a side elevational view of the top attaching bracket, as above.

The lever 47 is retained within the mount 45 through a hole on one side and a slot on the other with a drive pin positioned transversely to the slot and is best shown in FIG. 10. The arrangement allows the lever to move freely, and the compressive force is between the hole on the end of the slot in the mount 45 and the arm 30.

The bracket 40 by itself may be formed integrally of cast aluminum or brass, or may be molded of thermoplastic material having high impact and tensile strength, such as urethane, nylon, acetal, polycarbonate or phenolic. The bracket 40 may also be fabricated of aluminum tube with the fingers of extruded bars welded on each end.

Figure 2:
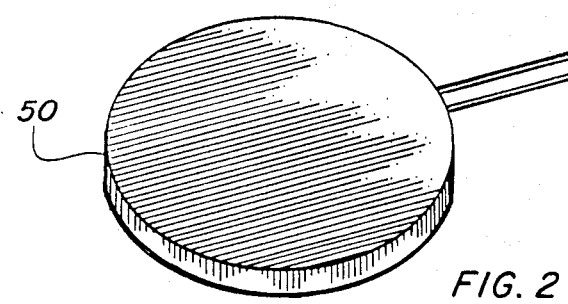
FIG. 2 is a partial isometric view of the preferred embodiment with the arm inverted and the bracket mounted above the horizontal axis of the table with the top in a round configuration.
Figure 9:
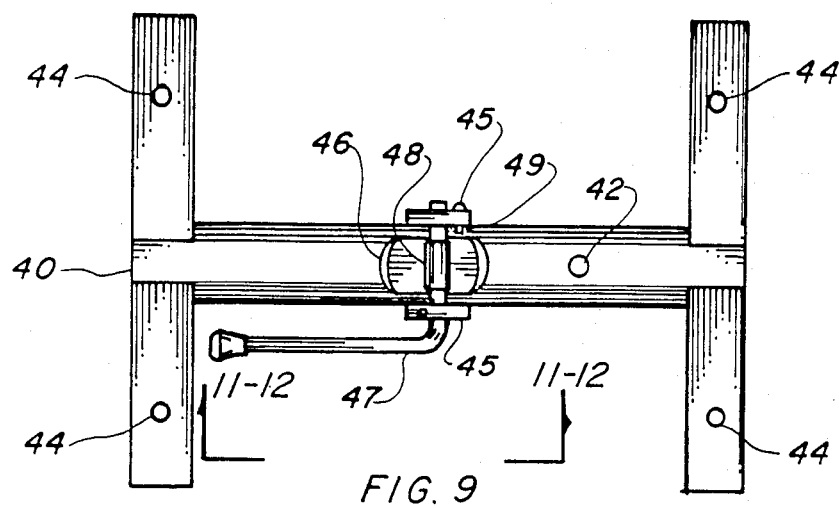
FIG. 9 is a plan view of the upper surface of the top attaching bracket removed from the invention for clarity.

A table top 50, shown best in FIGS. 1 and 2, is permanently attached, with conventional securing means, to the flat mounting plane of the bracket 40. The top 50 consists of a flat working surface on the upper side and a mating attaching surface on the bottom that interfaces directly with the bracket 40. The shape of the top 50 itself may be square, round, oval, oblong, or any contour to fit the particular application. Fiddle rails 52 are included on the top surface in marine applications to prevent material placed thereon from slipping during movement of the craft. Reinforcing members, not shown, may be incorporated on the bottom to add support in the area of attachment to the bracket 40. The top 50 consists of a rigid material, such as plywood, pressed board, fiberglass, metal, or combinations having plastic laminated top surfaces, with teak wood being preferred.

In function, the bulkhead bracket 20 is permanently attached to a vertical surface, such as a wall or bulkhead. In many cases more than one bracket may be utilized allowing the table to be located at convenient positions for meals, refreshments, or used as a utility surface. The bracket 20 may be located below the table surface with the arm 30 protruding upward or in reverse fashion, as shown in FIG. 2, with the arm 30 hanging down, such as on the side of a vehicle where ground clearance precludes conventional positioning.

The arm 30 is slideably inserted into the cavity 22 of the bracket 20 with the detents 34 limiting the distance. The detents 34 mate with the bracket notches 24 in a meshing fashion, allowing the arm 30 to be lifted upward and rotated while a portion of the arm 30 is still in the bracket 20 being slideably affixed within the cavity 22. This rotational movement allows angular adjustment a full 360 degrees and locks in when gravity maintains the detents 34 with the pre-disposed displacement of the notches 24. The detents 34 have the capability of being relocated within another pair of mating bores 32 in the arm 30 for adjustment, also, either end of the leg may be inserted into the bracket 20 for major adjustment in height.

Likewise, the upper end of the arm 30 is inserted into the bracket 40 that has been assembled to the top 50 utilizing the detents 34 in the same adjustable manner. Since at least one pair of holes 42 in the bracket 40 are at 90 degrees from the others, the table top may be locked vertically for storage or in cramped quarters when a person is to be seated, the top may be swiveled vertically allowing entry. The top 50 and arm 30 being separable allow storage in confined areas and the permanent bracket 20 remains attached inconspicuously. After the upper arm 30 is attached, as above, the table top 50 is permanently secured by the lever 47, eliminating completely the small amount of movement that exists between the arm 30 and the bracket 40, resulting from the clearance of the holes 42 in relation to the detents 34. This is accomplished by simply rotating the lever 47 upward toward the underside of the table top 50 until it hits the stop 49. Removal is accomplished in the opposite manner, pulling the lever 47 down and letting it swing freely. In use a small flat area develops on the arm 30 where the roller sleeve 48 interfaces with the arm. This aids the functioning of the lever 47 and is included as part of the design.

While the invention has been described in complete detail and pictorially shown in the accompanying drawings, it is not to be limited to such details, since many changes and modifications may be in the invention without departing from the spirit and the scope thereof. Hence, it is described to cover any and all modifications and forms which may come within the language and scope of the appended claims.

I claim:

1. A bulkhead mounted multi-location adjustable table comprising:
   (a) a bulkhead bracket having a cavity therethrough with a plurality of notches on the top periphery and permanent attaching means for securing the bracket to said bulkhead;
   (b) a davit shaped arm having a first and second end with a plurality of bores therethrough on each end, slideably penetrating said bulkhead bracket cavity on the first end for angularly supporting weight thereupon;
   (c) a plurality of spring loaded detents positioned within said davit shaped arm structure on each end extending from said bores in said arm urged outwardly under the influence of the spring providing a locking structure on said arm first end mating with said bracket notches in a meshing fashion while lifted upward and rotated allowing a portion of said arm to remain partially slideably affixed within the bulkhead bracket cavity for angularly positioning said arm when replaced in said notches;

(d) a separable top attaching bracket having end extending fingers, a round opening therethrough, a "U" shaped mount with a lever clearance hole between the separated ends, and a plurality of aligned holes, said top attaching bracket slideably received by said second end of said arm with said detents penetrating the aligned holes in locking fashion providing an adjustable structural mounting plane;

(e) a table top having a flat surface permanently affixed to said mounting plane of the top attaching bracket with securing means providing a table for placing objects in a convenient location with said top being slideably removable from said arm and the arm slideably removable from said bulkhead bracket providing a storable multi-location table when used in conjunction with more than one permanently mounted bulkhead bracket;

(f) a stabilizer lever rotatably connected through said "U" shaped mount on the top attaching bracket in such a manner as to apply pressure upon said arm mounted within the attaching bracket when rotated parallel with said table top rendering the top stable in relationship with the arm said lever further having a roller sleeve rotatably disposed upon said lever allowing the lever to rotate within the sleeve when the sleeve is contiguously engaged with said arm preventing wear and uncontrolled deformation of the arm; and, (g) a rotation of 360 degrees of said table top and arm within said bracket, allowing positioning at the interface of said detents within said plurality of notches when nested therein.

2. The invention as recited in claim 1 wherein said detents further comprise: a pair of opposed rounded pins integral with said arm penetrating therethrough, also allowing relocation within the arm for linear adjustment from said first and second end of the arm affecting the location of said table top in respect to said bracket.

3. The invention in accordance with claim 1 wherein said holes in said top attaching bracket comprise: a position 90 degrees apart in opposed pairs allowing said table top to be rotated from a horizontal position to a vertical position for storage or access to said table.

4. The invention as recited in claim 1 wherein said "U" shaped mount further comprises: a lever stop fixed to said mount in such a location as to impede the travel of said stabilizer lever at the peak of the lever arm travel allowing the lever to apply the maximum amount of pressure to the arm and retain its locked position.

* * * * *